(12) United States Patent
Ikushima (10) Patent No.: US 11,384,862 B2
(45) Date of Patent: Jul. 12, 2022

(54) SEAL STRUCTURE, AND DEVICE WITH SAID SEAL STRUCTURE

(71) Applicant: MUSASHI ENGINEERING, INC., Mitaka (JP)

(72) Inventor: Kazumasa Ikushima, Mitaka (JP)

(73) Assignee: MUSASHI ENGINEERING, INC., Tokyo (JP)

( * ) Notice: Subject to any disclaimer, the term of this patent is extended or adjusted under 35 U.S.C. 154(b) by 488 days.

(21) Appl. No.: 16/487,296

(22) PCT Filed: Feb. 22, 2018

(86) PCT No.: PCT/JP2018/006538
§ 371 (c)(1),
(2) Date: Aug. 20, 2019

(87) PCT Pub. No.: WO2018/155580
PCT Pub. Date: Aug. 30, 2018

(65) Prior Publication Data
US 2019/0376617 A1    Dec. 12, 2019

(30) Foreign Application Priority Data
Feb. 24, 2017    (JP) .............................. JP2017-032975

(51) Int. Cl.
*F16K 41/04*    (2006.01)
*B05B 1/30*    (2006.01)
*B05C 11/10*    (2006.01)

(52) U.S. Cl.
CPC ............ *F16K 41/04* (2013.01); *B05B 1/3046* (2013.01); *B05C 11/1026* (2013.01)

(58) Field of Classification Search
CPC .... F16K 41/04; B05B 1/3046; B05C 11/1026
(Continued)

(56) References Cited

U.S. PATENT DOCUMENTS 2,594,539 A * 4/1952 Brown ................... B65D 83/75
                                                              239/583
3,073,490 A    1/1963 Dahl et al.
(Continued)

FOREIGN PATENT DOCUMENTS

JP    51-4841 U1    1/1976
JP    52-160047 U1    12/1977
(Continued)

OTHER PUBLICATIONS

International Search Report dated May 22, 2018, issued in counterpart Application No. PCT/JP2018/006538 (1 page).
(Continued)

*Primary Examiner* — Steven J Ganey
(74) *Attorney, Agent, or Firm* — Westerman, Hattori, Daniels & Adrian, LLP (57) ABSTRACT

A seal structure that keeps a needle from sliding with respect to a seal and is easily detachable, and a device having the seal structure. A needle of a valve device is inserted through a seal. A valve device includes a fluid chamber having an outflow hole and au inflow hole, and the needle of which fore end reciprocates in the fluid chamber. The seal includes a main body made of an elastic body having a needle fitting insertion hole formed for the needle to be inserted and fit into. A flange portion is made of an elastic body annularly extending from the main body in a radial direction outward. One end opening diameter ($D_3$) of the needle fitting insertion hole is smaller than the other end opening diameter ($D_2$) of the needle fitting insertion hole.

14 Claims, 9 Drawing Sheets

(58) Field of Classification Search
USPC ........... 239/583, 584, 102.2, 533.11, DIG. 4;
222/542, 559; 277/345, 591, 636
See application file for complete search history.

(56) References Cited

U.S. PATENT DOCUMENTS

| | | | | | |
|---|---|---|---|---|---|
| 3,255,974 | A | * | 6/1966 | Roosa | B05B 1/00 |
| | | | | | 239/584 |
| 3,722,801 | A | * | 3/1973 | Chapuis | F02M 61/12 |
| | | | | | 239/584 |
| 4,798,314 | A | | 1/1989 | Worth et al. | |
| 5,129,658 | A | * | 7/1992 | Berton | F16J 15/025 |
| | | | | | 239/533.11 |
| 7,070,066 | B2 | | 7/2006 | Strong et al. | |
| 2004/0081759 | A1 | | 4/2004 | Maruyama et al. | |
| 2012/0061426 | A1 | | 3/2012 | Hogan et al. | |

FOREIGN PATENT DOCUMENTS

| | | |
|---|---|---|
| JP | 7-299402 A | 11/1995 |
| JP | 2012-55883 A | 3/2012 |

OTHER PUBLICATIONS

International Preliminary Report on Patentability (Form PCT/PEA/409) issued in counterpart International Application No. PCT/JP2018/006538 dated Aug. 24, 2019 (6 pages).
Supplementary European Search Report dated Oct. 29, 2020, issued in counterpart EP Application No. 18758331.5.(1 page).

* cited by examiner

SEAL STRUCTURE, AND DEVICE WITH SAID SEAL STRUCTURE

TECHNICAL FIELD

The present invention relates a seal structure and a device, provided with said seal structure.

BACKGROUND ART

Needle type valves have a needle provided with a seal structure that separates a fluid chamber from a driving chamber in order to prevent fluid penetration into the driving chamber from the fluid chamber. The reason is that the fluid penetration into the driving chamber may cause malfunction and even inoperability if the worst happens.

In general, an O-ring is often used as the seal structure but a rod seal having a through-hole through which a needle slides (for example, Patent Document 1), a diaphragm (for example, Patent Document 2), or the like may also be used for higher sealability.

As an example using a rod seal, Patent Document 1 discloses an applicator that dispenses liquid by reciprocal movement of a valve stem where a pair of dynamic seals (90, 92) are provided in a main body (14) of the applicator. The first dynamic seal (90) prevents liquid in a liquid flow passage from leaking or migrating into a piston chamber at the top of the main body. The second dynamic seal (92) prevents air in the piston chamber from leaking or migrating into the liquid flow passage ([0014]).

As an example using a diaphragm, Patent Document 2 discloses a needle valve that discharges a coating material by periodical opening and closing with a needle A diaphragm (25) is provided between an outer barrel (22a) of a casing (22) and a liquid chamber case (29) to constitute a liquid chamber and a driving chamber. A guide shaft (28) integrated with a needle (34) together with a bobbin (23) around which a coil (24) is wound are disposed on the driving-chamber side of the diaphragm (25), and the needle (34) that fits a nozzle opening (30) is disposed on the liquid-chamber side of the diaphragm (25) ([0015] to [0016]).

PRIOR ART LIST

Patent Document

Patent Document 1: Japanese Patent Laid-Open Publication No. 2012-55883
Patent Document 2: Japanese Patent Laid-Open Publication No. H7-299402

SUMMARY OF THE INVENTION

Problems to be Solved by the Invention

However, a conventional rod seal with a through-hole through which a needle slides has a problem that reciprocal movement of the needle generates heat and causes adverse effects on fluid property (viscosity, density, or the like) and the shape of the seal (distortion, expansion, or the like). There is another problem that the sliding movement of the needle causes abrasion and dust, resulting in shorter lifetime of components.

A constitution using a diaphragm, which requires to be water-tightly fixed to a needle with a fixing member such as a screw, has a problem that attachment/detachment of the diaphragm that is deformable by small force requires time and a dedicated tool or special skill.

Thus, an object of the present invention is to provide a seal structure that keeps a needle from sliding with respect to the seal and is easily detachable, and a device having said seal structure.

Means for Solving the Problems

According to the present invention, there is provided a seal through which a needle of a valve device is to be inserted, the valve device including a fluid chamber having an outflow hole and an inflow hole, and the needle of which fore end reciprocates in the fluid chamber, the seal including a main body made of an elastic body having a needle fitting insertion hole formed for the needle to be inserted and fit into, and a flange portion (104, 105) made of an elastic body annularly extending from the main body in a radial direction outward, where one end opening diameter ($D_3$) of the needle fitting insertion hole is smaller than another end opening diameter ($D_2$) of the needle fitting insertion hole.

In the above-mentioned seal, the main body and the flange portion may be integrally formed.

In the above-mentioned seal, the needle fitting insertion hole may (a) comprise a first diameter, a second diameter, and a stepped portion, (b) have a cross section where an inner periphery surface is tapered, (c) have a cross section where an inner periphery surface curves convexly inward, or (d) have a cross section where an inner periphery surface curves convexly outward.

In the above-mentioned seal, an outer periphery portion (105) of the flange portion may have a protrusion formed on at least one side out of an outflow-hole side and a side opposite to the outflow hole.

In the above-mentioned seal, the flange portion (104, 105) may extend in a radial direction outward from a position nearer to an end portion on the side opposite to the outflow hole than to an end portion on the outflow-hole side.

In the above-mentioned seal, the flange portion (104, 105) may extend in a radial direction outward from an end portion of the main body on the side opposite to the outflow hole.

According to a first aspect of the present invention, there is provided a seal structure of a valve device including a fluid chamber having an outflow hole and an inflow hole, and a needle of which fore end reciprocates in the fluid chamber, the seal structure including the above-mentioned seal, and the needle inserted through the seal, where an end opening diameter ($D_3$) of the needle fitting insertion hole on an outflow-hole side and an end opening diameter ($D_2$) of the needle fitting insertion hole on a side opposite to the outflow hole are both smaller than a diameter ($D_1$) of the needle.

According to a second aspect of the present invention, there is provided a seal structure of a valve device including a fluid chamber having an outflow hole and an inflow hole, and a needle of which fore end reciprocates in the fluid chamber, the seal structure including the above-mentioned seal, and a housing in which the fluid chamber is formed, where the main body of the seal is configured to be narrower than the fluid chamber, where the housing comprises a first housing member (207) including the fluid chamber, and a second housing member (206) including a driving chamber (204) that is wider than the needle and through which the needle is to be inserted, where at least one of the first housing member (207) and the second housing member (206) comprises a stepped portion (215) in contact with a surface of the flange portion, the surface being adjacent to an outer periphery edge of the flange portion, where the first housing member (207) and the second housing member (206) are coupled with each other in a state where an outer periphery portion (105) of the flange portion is pressed therebetween, and where an inner periphery portion (104) of the flange portion, when the needle reciprocates, deforms accordingly to keep a positional relationship between the needle and the main body unchanged.

In the above-mentioned seal structure of the second aspect of the present invention, an end opening diameter ($D_3$) of the needle fitting insertion hole on an outflow-hole side and an end opening diameter ($D_2$) of the needle fitting insertion hole on a side opposite to the outflow hole may be both smaller than a diameter ($D_1$) of the needle.

According to the present invention, there is provided a valve device including the above-mentioned seal, a fluid chamber having an outflow hole and an inflow hole, a needle of which fore end reciprocates in the fluid chamber, a housing in which the fluid chamber is formed, and a needle driving device that cause the needle to reciprocate, where the valve device ejects fluid, supplied to the inflow hole, from the outflow hole, where the main body of the seal is narrower than the fluid chamber, and the needle fitting insertion hole is narrower than the needle, where the housing comprises a first housing member (207) including the fluid chamber, and a second housing member (206) including a driving chamber (204) that is wider than the needle and through which is the needle is inserted, where at least one of the first housing member (207) and the second housing member (206) comprises a stepped portion (215) in contact with a surface of the flange portion, the surface being adjacent to an outer periphery edge of the flange portion, where the first housing member (207) and the second housing member (206) are coupled with each other in a state where an outer periphery portion (105) of the flange portion is pressed therebetween, and where an inner periphery portion (104) of the flange portion, when the needle reciprocates, deforms accordingly to keep a positional relationship between the needle and the main body unchanged.

In the above-mentioned valve device, the needle driving device may comprise an actuator, and the valve device may further comprise a stroke adjustment mechanism that adjusts a stroke of the needle.

According to the present invention, there is provided a fluid discharge device including the above-mentioned valve device, a reservoir fluidically connected to the inflow hole, a nozzle having a discharge port fluidically connected to the outflow hole, and a valve control device that controls operation of the valve device.

In the above-mentioned fluid discharge device, the reservoir may be a reservoir for a liquid material. Furthermore, the fluid discharge device may be a jet type discharge device that discharges and flies a liquid droplet from the discharge port by moving the needle forward to collide against a valve seat that is an inlet portion of the outflow hole or by moving the needle forward and stopping the needle immediately before colliding against the valve seat.

According to the present invention, there is provided an application device including the above-mentioned fluid discharge device, a stage on which an application target is placed, a relative driving device that moves the fluid discharge device and the stage relative to one another, and a stage control device that controls operation of the relative driving device.

Advantageous Effect of the Invention

According to the present invention, a needle does not slide with respect to a seal and thus the problem of heat generation and abrasion in the seal can be solved.

Additionally, the seal is easily attachable and detachable without a tool or skill.

BRIEF DESCRIPTION OF THE DRAWINGS

FIG. 4(a) is a sectional view of a seal according to a second embodiment, (b) is a sectional view of a seal according to a third embodiment, and (c) is a sectional view of a seal according to a fourth embodiment.

FIG. 5(a) is a partial sectional view of a seal according to a fifth embodiment, (b) is a partial sectional view of a seal according to a sixth embodiment, (c) is a partial sectional view of a seal according to a seventh embodiment, (d) is a partial sectional view of a seal according to an eighth embodiment, (e) is a partial sectional view of a seal according to a ninth embodiment, and (f) is a partial sectional view of a seal according to a tenth embodiment.

FIG. 6(a) is a sectional view of a seal according to an eleventh embodiment and (b) is a sectional view of a seal according to a twelfth embodiment.

MODE FOR CARRYING OUT THE INVENTION

Example modes for carrying out the present invention will be described below. Seal structures exemplified in first to twelfth embodiments are mainly used for dispensers that discharge a liquid material by opening/closing a valve seat with a needle fore end portion. However, the seal structures of the present invention are applicable to any valve that controls fluid flow.

First Embodiment

A seal structure according to a first embodiment includes a seal 101, upper and lower housing members (206, 207) in which a fluid chamber 205 is formed, and a needle 203.

Figure 1:
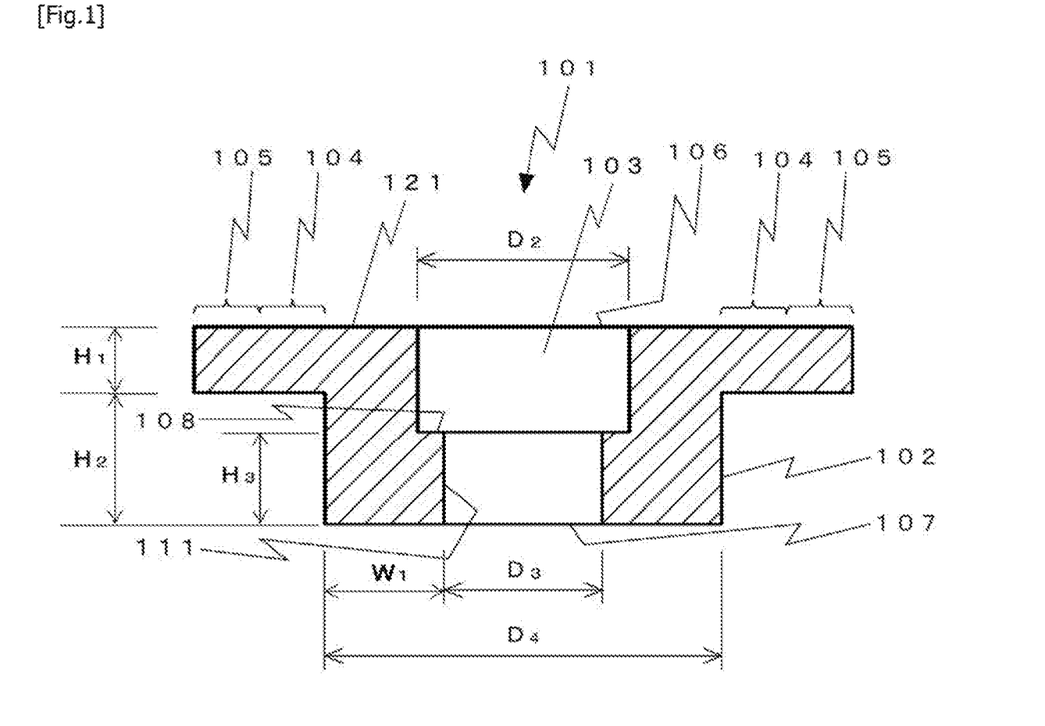
FIG. 1 is a sectional view of a seal according to a first embodiment.

As shown in FIG. 1, the seal 101 comprises a cylindrical main body 102, a through-hole 103 that is bored through the main body 102 and has different inner diameters on the upper and lower sides, and a flange portion (104, 105) formed in a convex shape on the periphery of the main body 102.

The main body 102 is a cylindrical member and extends in a direction parallel to the needle 203 (i.e. vertical direction). The main body 102 has a length ($H_1+H_2$) of, for example, 2 to 4 mm, or speaking from another point of view, for example, two to five times the thickness $H_1$ of the flange portion (104, 105) (or the thickness $W_1$ of a through-hole sidewall 111). The main body 102 length ($H_1+H_2$) of a certain length or more can achieve high holding force. The main body 102 has an outer diameter ($D_4$) smaller than the inner diameter ($D_0$) of the fluid chamber 205 so as to be movable without contact with the inner wall of the fluid chamber 205.

The through-hole 103 is bored through the center of the main body 102 in a direction parallel to the needle 203 (i.e. vertical direction). An upper end opening 106 and a lower end opening 107, both constituting the end openings of this through-hole 103, have inner diameters both smaller than the outer diameter of the needle 203. The inner diameter of the lower end opening 107 is smaller than the inner diameter of the upper end opening 106. In other words, assuming that the outer diameter of the needle 203 is $D_1$, the inner diameter of the upper end opening 106 of the through-hole 103 is $D_2$, and the inner diameter of the lower end opening 107 of the through-hole 103 is $D_3$, a relationship $D_1>D_2>D_3$ is satisfied. The smaller inner diameter ($D_3$) of the lower end opening 107 than the inner diameter ($D_2$) of the upper end opening 106 makes the needle 203 easily attachable to and detachable from the seal 101. The reason is that, as the upper side of the needle 203 connects to the needle driving device 202, the needle 203 is inserted into the seal 101 from the upper side of the seal 101 having the larger inner diameter and the needle 203 is removed from the seal 101 by moving toward the upper side of the seal 101 having the larger inner diameter.

Figure 4:
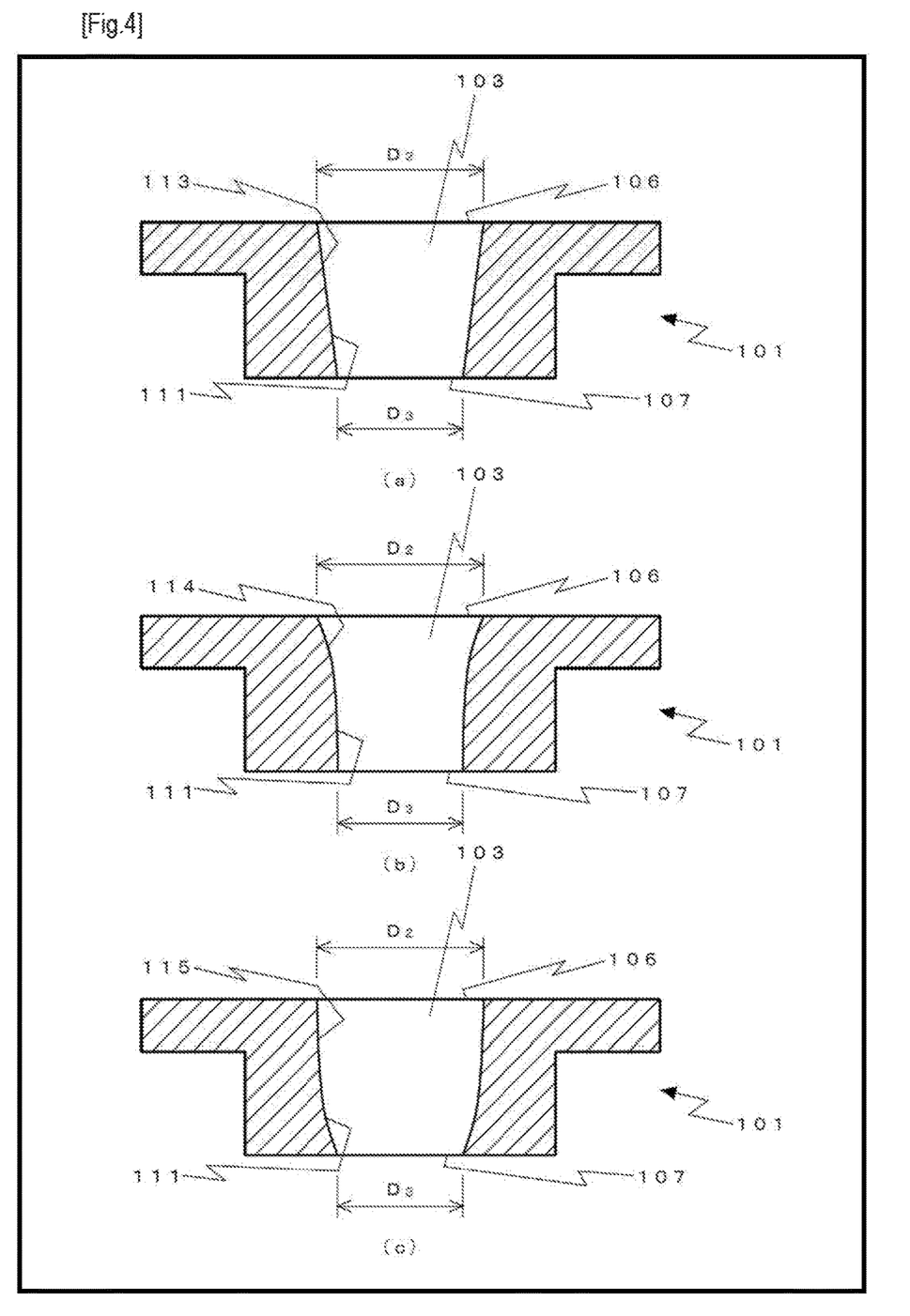

Additionally, the smaller inner diameter of the lower end opening 107 than the inner diameter of the upper end opening 106 causes the seal 101 to more strongly tightens at the lower side, which can prevent the fluid penetration into the upper side of the seal 101 more surely than a case where the through-hole 103 has a uniform diameter. Note that, in the present embodiment, the through-hole 103 is provided with a stepped portion 108, but may have another shape (see FIG. 4 described below, for example).

The flange portion (104, 105) is an annular plate-like member convexly formed in a radial direction outward from the outer periphery of the main body 102, and comprises an inner periphery portion 104 and an outer periphery portion 105. The main body 102 and the flange portion (104, 105) are preferably integrally configured. The flange portion (104, 105) may extend in a radial direction outward with a small angle (for example, 15 degrees or less) with respect to the horizontal plane, but preferably extends toward a horizontal direction like the present embodiment. The shape of the flange portion (104, 105) as viewed from the top may not necessarily be an exact circle. The annular shapes mentioned above include a shape having a corner portion or a concave portion at a part of the outer periphery of fringe, and a polygonal shape.

The inner periphery portion 104 is an inner part of the flange portion, and connects the main body 102 to the outer periphery portion 105. From another point of view, the inner periphery portion 104 corresponds to a part of the flange portion which spans the range from the inner diameter of the fluid chamber 205 to the outer diameter of the main body 102. It is assumed that the thickness $H_1$ of the inner periphery portion 104 is, for example, 0.2 to 2 mm, or speaking from another point of view, for example, 0.5 to 3 times the thickness of the main body 102 in the horizontal direction (a half of a difference between the outer diameter ($D_4$) of the main body 102 and the inner diameter ($D_2$) of the through-hole 103). The reason is that excessive thickness inhibits elastic deformation and may cause the needle 203 to slide with respect to the through-hole sidewall 111.

The elastic deformation of the inner periphery portion 104 between the main body 102 and the outer periphery portion 105 prevents the needle 203 from sliding within the through-hole 103 of the seal 101 and allows the needle 203 to appropriately move. Note that, in the present embodiment, the flange portion (104, 105) is provided to an upper end portion 121 of the main body 102, but as described later, may be provided to a position lower than the upper end portion 121 (see FIG. 6 described below, for example).

The outer periphery portion 105 is an outer part of the flange portion and is formed on the outside edge of the inner periphery portion 104. From another point of view, the outer periphery portion 105 corresponds to a part of the flange portion sandwiched between the respective upper and lower housing members (206, 207). The outer periphery portion 105 is fixedly sandwiched between the respective upper and lower housing members (206, 207), which defines the position of the seal 101 in the fluid chamber 205. Excessive thinness of the outer periphery portion 105 can hardly ensure a deformation amount in fixedly pressing between the upper and lower housings (206, 207). Thus, a proper thickness is required. The thickness of the outer periphery portion 105 in the present embodiment is $H_1$ being equal to the thickness of the inner periphery portion 104. Note that, in the present embodiment, the outer periphery portion 105 extends in a radial direction outward having the same shape as the inner periphery portion 104, but as described later, may have another shape (see FIG. 5 described below, for example).

The seal 101 is made of elastic material, and in the present embodiment, especially formed using rubber. In more detail, it is disclosed that silicone rubber, fluoro-rubber, nitrile rubber, acrylic rubber, or polyurethane rubber is used, for example.

Figure 2:
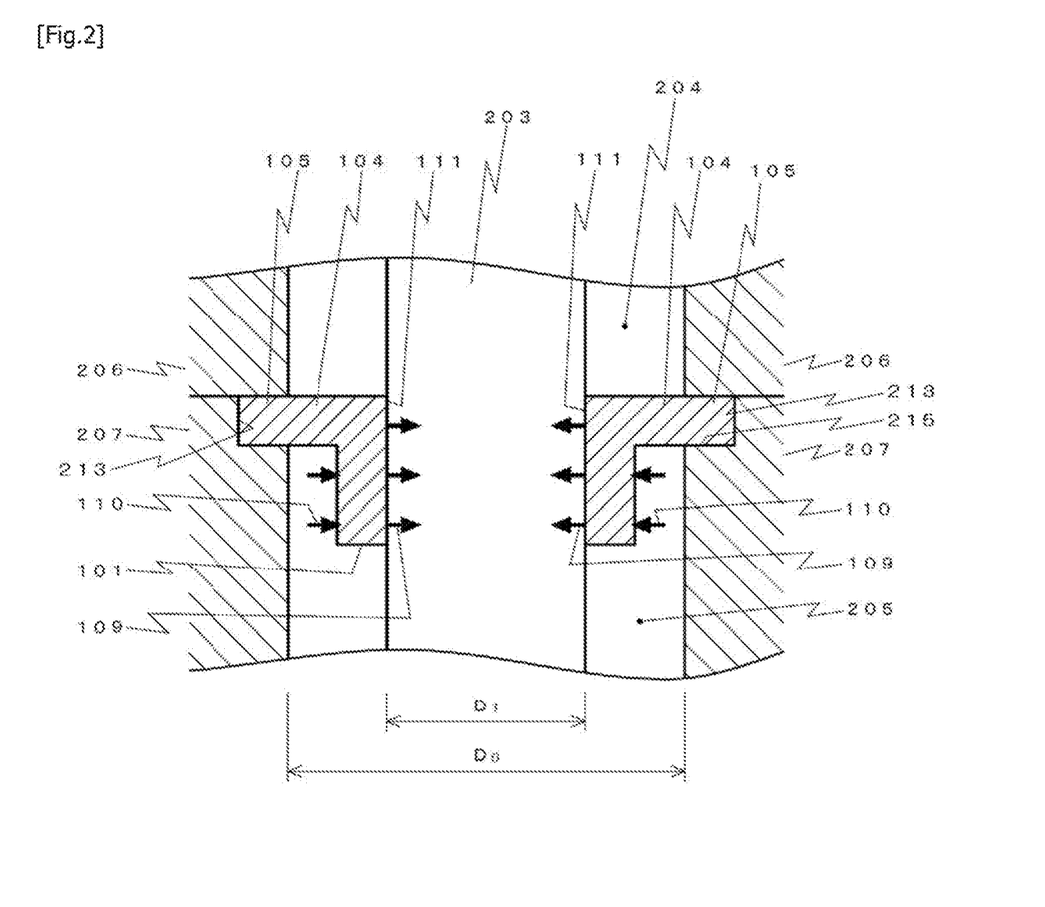
FIG. 2 is an explanatory view of an installation state of the seal according to the first embodiment.

As shown in FIG. 2, the seal 101 has the through-hole 103 to which the needle 203 is fit by insertion and the position of the seal 101 is defined in the fluid chamber 205 by having the outer periphery portion 105 sandwiched between the upper and lower housing members (206, 207).

As shown in FIG. 2, on the upper edge portion of the lower housing member 207, an annular concave portion (expanding-diameter portion) is formed. The inner periphery wall of this concave portion is referred to as an expanding-diameter wall 213 and the inner bottom surface thereof is referred to as a stepped portion 215 in this Specification. The inner periphery of the expanding-diameter wall 213 has a diameter substantially equal to the diameter of the outer periphery of the flange portion (104, 105), The height of the expanding-diameter wall 213 is slightly lower than the height $H_1$ of the flange portion (104, 105). The edge surface (bottom surface) of the upper housing member 206 squashes the upper surface of the seal 101, which enhances sealing performance. In other words, the edge surfaces of the upper and lower housing members (206, 207) press the seal 101 to fix it to the upper and lower housing members (206, 207), which makes detachment/attachment work of the seal 101 easier. The upper and lower housing members (206, 207) are detachably coupled with each other by a coupling mechanism not shown.

Unlike the present embodiment, the expanding-diameter wall 213 may be provided to the upper housing member 206. The expanding-diameter walls 213 of the same diameters may also be provided to both the upper housing member 206 and the lower housing member 207.

When the needle 203 is fixed to the through-hole 103 by insertion, the through-hole 103 elastically deforms along the external shape of the needle 203 due to the smaller inner diameter of the through-hole 103 than the outer diameter of the needle 203. The seal 101, which is made of elastic material, tries to return to its original shape and thus exerts force toward a shrinking direction of the through-hole 103, that is, toward a direction for pressing the through-hole sidewall 111 against the outside surface of the needle 203 (reference symbol 109). This force acts to fix the seal 101 to the needle 203. In the present embodiment, the action of this force is enough for the seal 101 to be fixed to the needle 203 without using an extra fixing member such as a screw. The action of this force also prevents fluid below the inner periphery portion 104 (at the fluid-chamber 205 side) from climbing the needle 203 to penetrate upward beyond the inner periphery portion 104 (at the driving-chamber 204 side).

The through-hole 103 of the seal 101 according to the embodiment is configured such that the inner diameter ($D_3$) of the lower end opening 107 is smaller than the inner diameter ($D_2$) of the upper end opening 106 as well as that the inner diameters are smaller than the outer diameter of the needle 203. This can achieve stronger tightening at the lower side of the seal 101, the lower side being the fluid-chamber 205 side, and prevent the fluid penetration into the upper side of the seal 101, the upper side being the driving-chamber 204 side, more remarkably than a conventional seal 101. In other words, required sealing force is ensured over the certain length ($H_3$) from the lower end opening 107 of the through-hole 103 and easy attachment/detachment is achieved by weakening the sealing force over the portion exceeding the certain length ($H_3$).

Additionally, when the seal 101 is used in a valve device 201 shown in FIG. 7 (described later in detail), pressurized fluid filling the space below the inner periphery portion 104 (at the fluid-chamber 205 side) exerts pressure on the surface of the seal 101. This pressure exerts force toward a direction for pressing the seal 101 against the needle 203 (reference symbol 110). Since this force works together with the above mentioned restoring force (reference symbol 109) of the seal 101, the seal 101 is more strongly fixed to the needle 203, which can more surely prevent the fluid below the inner periphery portion 104 (at the fluid-chamber 205 side) from penetrating upward beyond the inner periphery portion 104 (at the driving-chamber 204 side).

The seal 101 according to the present embodiment acts as follows during operation of the needle 203.

As shown in FIG. 2, the seal 101 is tightly fixed to the needle 203 by the seal restoring force (reference symbol 109) and the pressing force (reference symbol 110) due to the ambient fluid pressure mentioned above. In addition, the seal 101 is tightly fixed in the fluid chamber 205 by having the outer periphery portion 105 sandwiched between the respective upper and lower housing members (206, 207).

Figure 3:
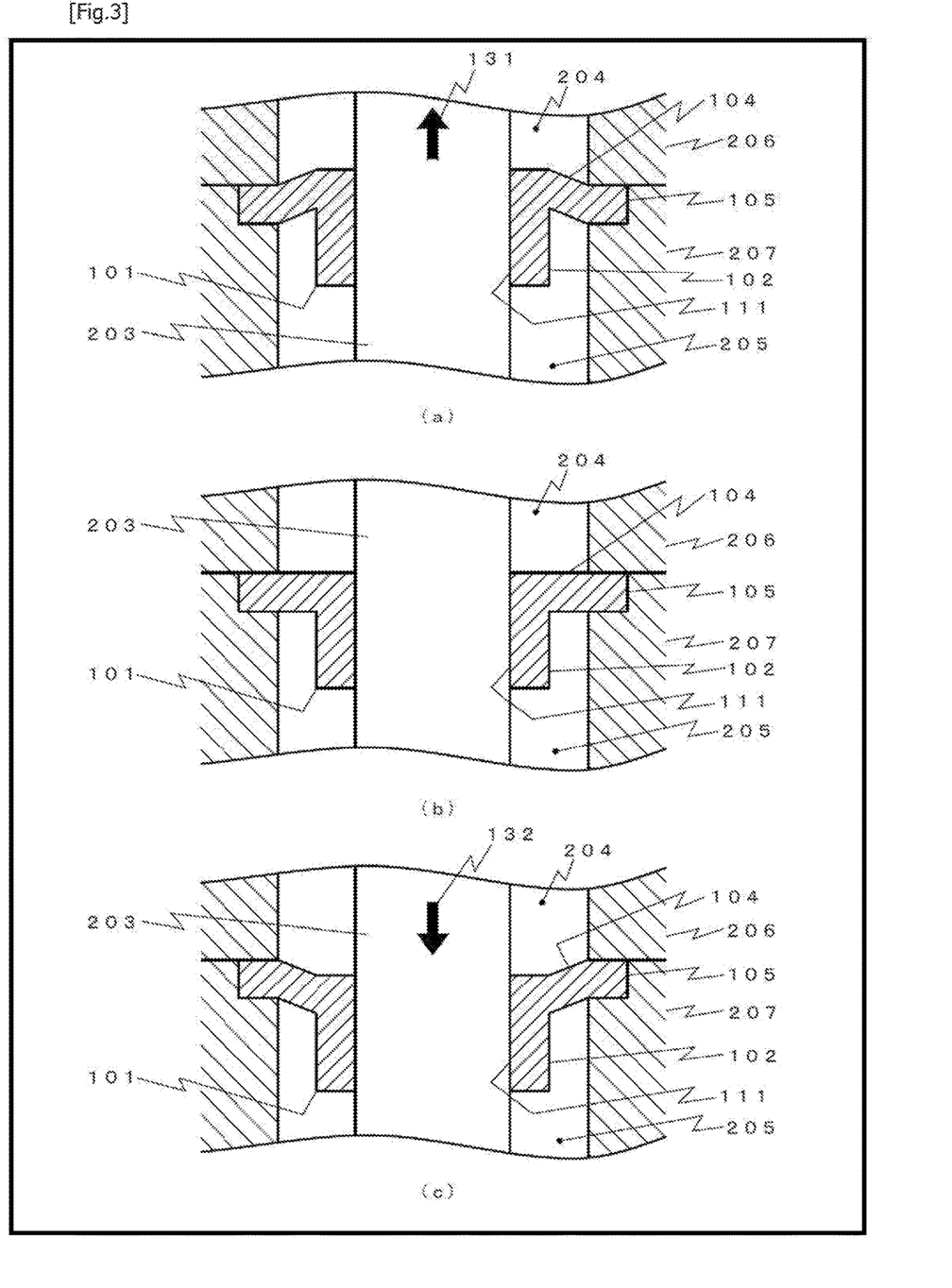
FIG. 3 is an explanatory view of an action of the seal according to the first embodiment. Herein, (a) shows a state where a needle has moved upward, (b) shows a state where the needle has not moved, and (c) shows a state where the needle has moved downward.

FIG. 3 is an explanatory view of an action of the seal 101 according to the present embodiment. Since the seal 101 is made of elastic material, the inner periphery portion 104 elastically deforms when the needle 203 moves upward (reference symbol 131) (FIG. 3(a)) from a non-movement state (FIG. 3(b)) or when the needle 203 moves downward (reference symbol 132) (FIG. 3(c)) from the non-movement state (FIG. 3(b)). Such elastic deformation let the needle 203 move together with the main body 102 of the seal 101 without sliding against the through-hole sidewall 111. The reason is that, when operating the needle 203, the seal restoring force (Fs) (reference symbol 109) and the pressing force (Fp) (reference symbol 110) due to the ambient fluid pressure described above cause friction force (Ff=μ(Fs+Fp)) to work on the contact surface between the seal 101 and the needle 203, and that this friction force (referred to as maximum static friction force) surpasses force (Fn) to move the needle 203. That is, there is a relationship represented by the following Math. 1.

$$Ff=\mu(Fs+Fp)>Fn \qquad \text{[Math. 1]}$$

where μ denotes friction coefficient.

As described above, the seal 101 according to the first embodiment elastically deforms without sliding during operation of the needle 203, which results in no heat generation and no abrasion. This yields advantageous effects such as less influence on fluid and the seal 101 itself, no dust generation, and longer lifetime of components.

Second to Fourth Embodiments

A second embodiment relates to a seal 101 including a through-hole sidewall 111 having a tapered portion 113 as shown in FIG. 4(a).

A third embodiment relates to a seal 101 including a through-hole sidewall 111 having a convexly inward-curving portion 114 as shown in FIG. 4(b).

A fourth embodiment relates to a seal 101 including a through-hole sidewall 111 having a convexly outward-curving portion 115 as shown in FIG. 4(c).

Through-holes 103 according to the second to fourth embodiments have an inner diameter ($D_2$) of an upper end opening 106 and an inner diameter ($D_3$) of a lower end opening 107, both satisfying a relationship that they are smaller than an outer diameter ($D_1$) of the needle 203 and that the inner diameter of the lower end opening 107 is smaller than the inner diameter of the upper end opening 106 ($D_1>D_2>D_3$). In any of the shapes, like the first embodiment, the smaller inner diameter of the lower end opening 107 than the inner diameter of the upper end opening 106 makes the needle 203 easily attachable to and detachable from the seal 101. Also, the smaller inner diameter of the lower end opening 107 than the inner diameter of the upper end opening 106 causes the lower side of the seal 101 to more strongly tighten, which can prevent fluid penetration upward beyond the seal 101 more surely than a seal 101 having a through-hole 103 of a uniform diameter.

Fifth to Tenth Embodiments

A fifth embodiment includes an outer periphery portion 105 having, on an end portion of a flange portion, a protrusion 116 of which cross section is rectangular and protrudes symmetrically upward and downward, as shown in FIG. 5(a).

A sixth embodiment includes an outer periphery portion 105 having, on an end portion of a flange portion, a circular-sectioned protrusion 117 of which cross section is circular and has an outer diameter larger than the thickness of an inner periphery portion 104, as shown in FIG. 5(b).

A seventh embodiment includes an outer periphery portion 105 having, on an end portion of a flange portion, a protrusion 118 of which cross section is trapezoidal, protrudes symmetrically upward and downward, and sloping down inward, as shown in FIG. 5(c).

An eighth embodiment includes an outer periphery portion 105 having, on an end portion of a flange portion, a protrusion 119 of which cross section is rectangular and protrudes only downward, as shown in FIG. 5(d).

A ninth embodiment provides an end portion of an inner periphery portion 104 with a protrusion 120 of which cross section is rectangular and protrudes only upward, as shown in FIG. 5(e).

A tenth embodiment includes an outer periphery portion 105 having, on an end portion of a flange portion, a protrusion 119 of which cross section is rectangular and protrudes only downward, with each corner of the inner periphery portion 104 and the outer periphery portion 105 rounded, as shown in FIG. 5(f).

Figure 5:
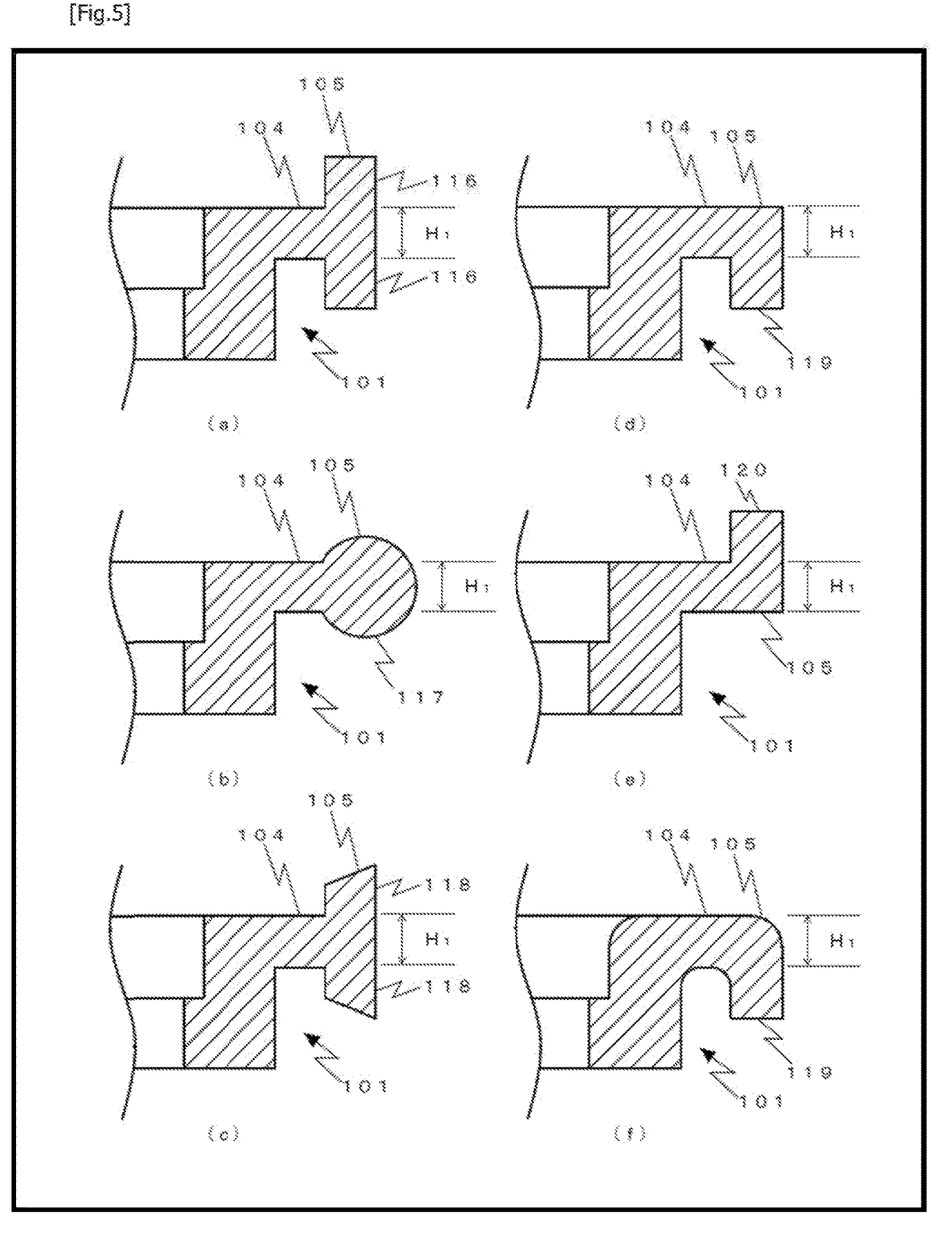

Note that each seal 101 shown in FIG. 5 is horizontally symmetrical, and thus only the right half of the seal 101 is illustrated and the left half thereof is not shown. Any shape other than the shapes exemplified in the fifth to tenth embodiments may apply, such as, for example, a symmetrical ellipse, oval, or cross shape, or an asymmetrical semi-circle shape, although not shown.

In this manner, by configuring a shape of the outer periphery portion 105 to be different from a shape of the inner periphery portion 104 and providing a corresponding groove fitting to the shape of the outer periphery portion 105 to the respective upper and lower housing members (206, 207), the seal 101 can be easily fixed and hardly be dislocated. In addition, the outer periphery portion 105 is fixedly sandwiched between the respective upper and lower housing members (206, 207), which defines the position of the seal 101 in the fluid chamber 205.

Eleventh to Twelfth Embodiments

An eleventh embodiment includes a flange portion (104, 105) provided to the midway position between an upper end portion 121 and a lower end portion 122 of a main body 102, as shown in FIG. 6(a). The position of the flange portion (104, 105) is not limited to the position of FIG. 6(a). They may be arranged at a position shifted from the midway position between the upper end portion 121 and the lower end portion 122 such that the cross section is line-symmetrical.

A twelfth embodiment includes a flange portion (104, 105) provided to a lower end portion 122 of a main body 102, as shown in FIG. 6(b).

Figure 6:
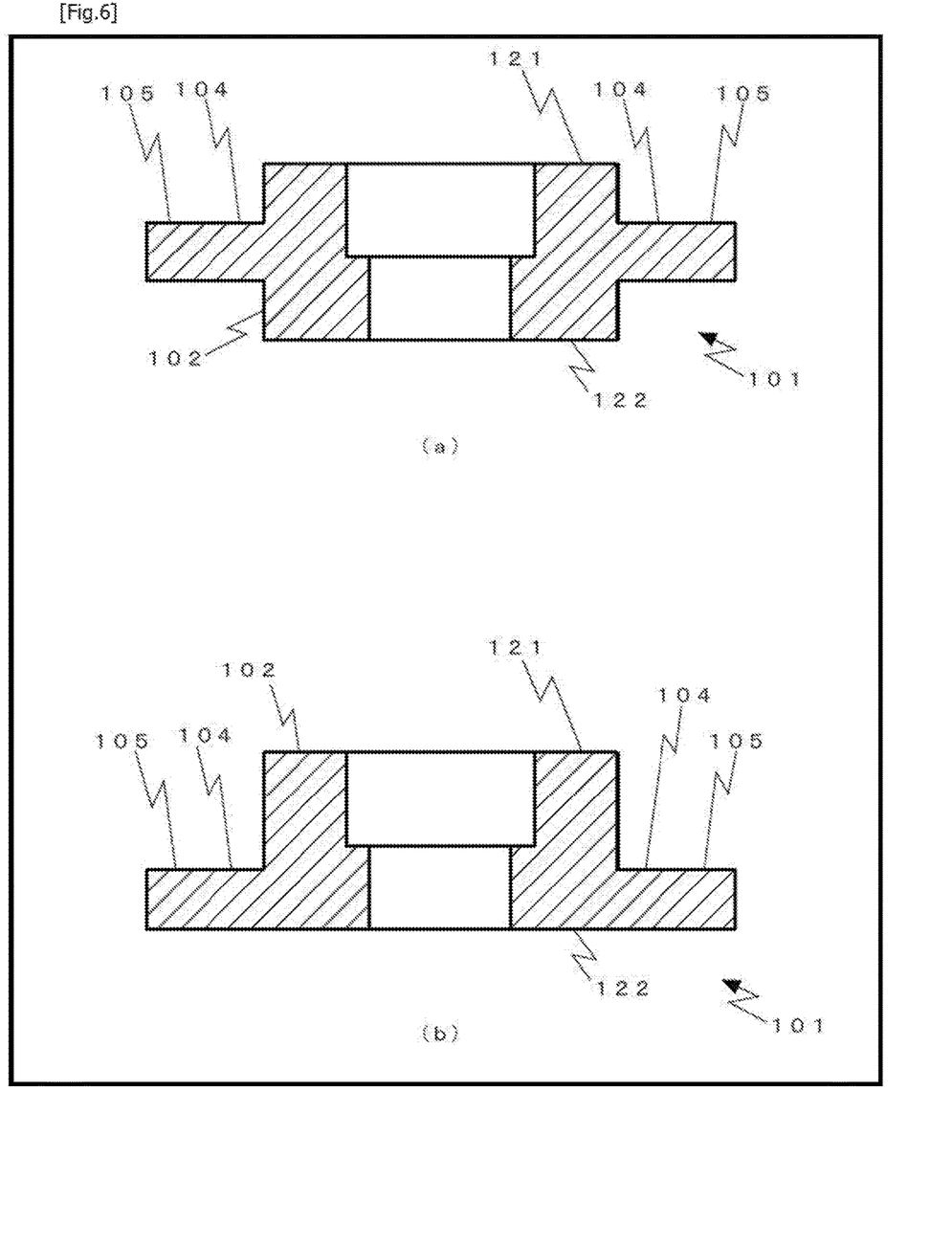

As described above, elastic deformation of the inner periphery portion 104 between the main body 102 and the outer periphery portion 105 allows the needle 203 to vertically reciprocate without sliding with respect to the seal 101.

The flange portion (104, 105) may be arranged at an arbitrary position between the upper end portion 121 and the lower end portion 122, but in terms of enhancing sealing force by effectively receiving pressure from fluid filling a fluid chamber 205, the flange portion (104, 105) may be preferably arranged at a position near to the upper end portion 121.

The positions of the flange portion (104, 105) disclosed in the eleventh to twelfth embodiments and the shapes of the through-hole 103 disclosed in the second to fourth embodiments and/or the shapes of the outer periphery portion 105 disclosed in the fifth to tenth embodiments may be arbitrarily combined.

Thirteenth Embodiment

A valve device 201 according to a thirteenth embodiment mainly comprises a housing (206, 207) provided with a driving chamber 204 that accommodates a needle driving device 202 and a fluid chamber 205 in which a needle 203 reciprocates, an inflow hole 208 from which fluid is supplied and an outflow hole 209 from which the fluid is ejected, both communicating with the fluid chamber 205, a valve seat 210 having the outflow hole 209, and a seal 101 separating the driving chamber 204 from the fluid chamber 205. It should be noted that a driving-chamber 204 side is sometimes referred to as an upside and a fluid-chamber 205 side is sometimes referred to as a downside hereinafter for convenience of explanation.

A seal 101 is the same as that of the first embodiment and thus its explanation is omitted. Note that any of the seals 101 of the second to twelfth embodiments may be used instead of the seal 101 of the first embodiment.

The housing comprises an upper housing member 206 and a lower housing member 207. The upper portion of the upper housing member 206 is provided with the driving chamber 204 that accommodates the needle driving device 202 for operating the needle 203. The needle 203 is coupled to the needle driving device 202 in the driving chamber 204 of which details are not shown. The lower portion of the driving chamber 204 is provided with a lower driving chamber interior wall 212 allowing the needle 203 to move, without sliding in contact therewith. Here, the needle driving device 202 is an actuator, and may use, for example, a mechanism to operate the needle 203 with a piston, which is provided to the driving-chamber 204 side of the needle 203 and divides the driving chamber 204 into two parts, by utilizing force of compressed gas or an elastic member (spring) that biases the needle 203 toward one direction, a mechanism to operate the needle 203 with a combination of an electric motor and a ball screw, a mechanism to operate the needle 203 by utilizing an electromagnet, a mechanism to operate the needle 203 by utilizing a piezoelectric element, or the like. A control device 222 controls operation of the needle driving device 202.

The lower housing member 207 adjacent to the driving chamber 204 is provided with the fluid chamber 205, which is a space where the fore end of the needle 203 is arranged, along an extending direction of the needle 203 (i.e., vertical direction). The upper portion of the fluid chamber 205 has an annular concave portion (expanding-diameter portion) formed to be surrounded by a peripheral expanding-diameter wall 213. In this annular concave portion, the seal 101 and seal holding members 214a and 214b are arranged.

At the center of the seal holding members 214a and 214b, which are made of annular plate-like members, through-holes of a diameter larger than that of the needle 203 are provided. Unlike the example of FIG. 7, the seal holding members 214a and 214b may be configured as one plate-like member. Also, the seal holding members 214a and 214b may be arranged at the lower side of the seal 101.

The inflow hole 208 for supplying fluid (reference symbol 218) into the fluid chamber 205 is provided on the side surface of the fluid chamber 205 by boring through a sidewall of the lower housing 207. The outside of the inflow hole 208 connects to a supply pipe 223 with a fixing member 217 and the inflow hole 208 and the supply pipe 223 always communicate with each other. The vertical position of the inflow hole 208 is not limited to the illustrated position and may be near to the seal 101 or near to the outflow hole 209 in accordance with characteristics of fluid to be used, a control condition, or the like. The intersection angle for connecting to the fluid chamber 205 is not necessarily perpendicular to the fluid chamber 205 as exemplified in FIG. 7, and may be acute or obtuse depending on fluid to be used.

A valve seat 210 having the outflow hole 209 through which the inside and the outside of the fluid chamber 205 communicate with each other is provided to the lower end of the fluid chamber 205. The valve seat 210 is fixed with a valve seat fixing member 220 into which the lower end portion of the lower housing 207 is screwed. The valve seat fixing member 220 is provided with a valve seat fixing member through-hole 221. An eject pipe 224 is connected to the bottom surface of the valve seat 210 using a fixing member 211 such that the eject pipe 224 communicates with the valve seat fixing member through-hole 221.

The outflow hole 209 of the valve seat 210 has an inner diameter smaller than the outer diameter of the needle 203, and can be closed when the hemispherical fore end of the needle 203 gets in contact with the valve seat 210. Note that the shape of the fore end of the needle 203 is not limited to the exemplified shape, and for example, may be flat, may have a projection provided to the center thereof, or may be tapered.

The fluid chamber 205 is supplied with fluid by a pump or the like, not shown, and the supply to the fluid chamber 205 is performed in a state where pressure is applied. As a result, the pressing force (reference symbol 110) due to the pressure applied to the fluid, in addition to the restoring force (reference symbol 109) of the seal 101, can be utilized for fixing the seal 101 to the needle 203, which can more surely prevent the fluid penetration into the driving-chamber 204 side.

The valve device 201 according to the thirteenth embodiment configured as above operates generally as follows.

Figure 7:
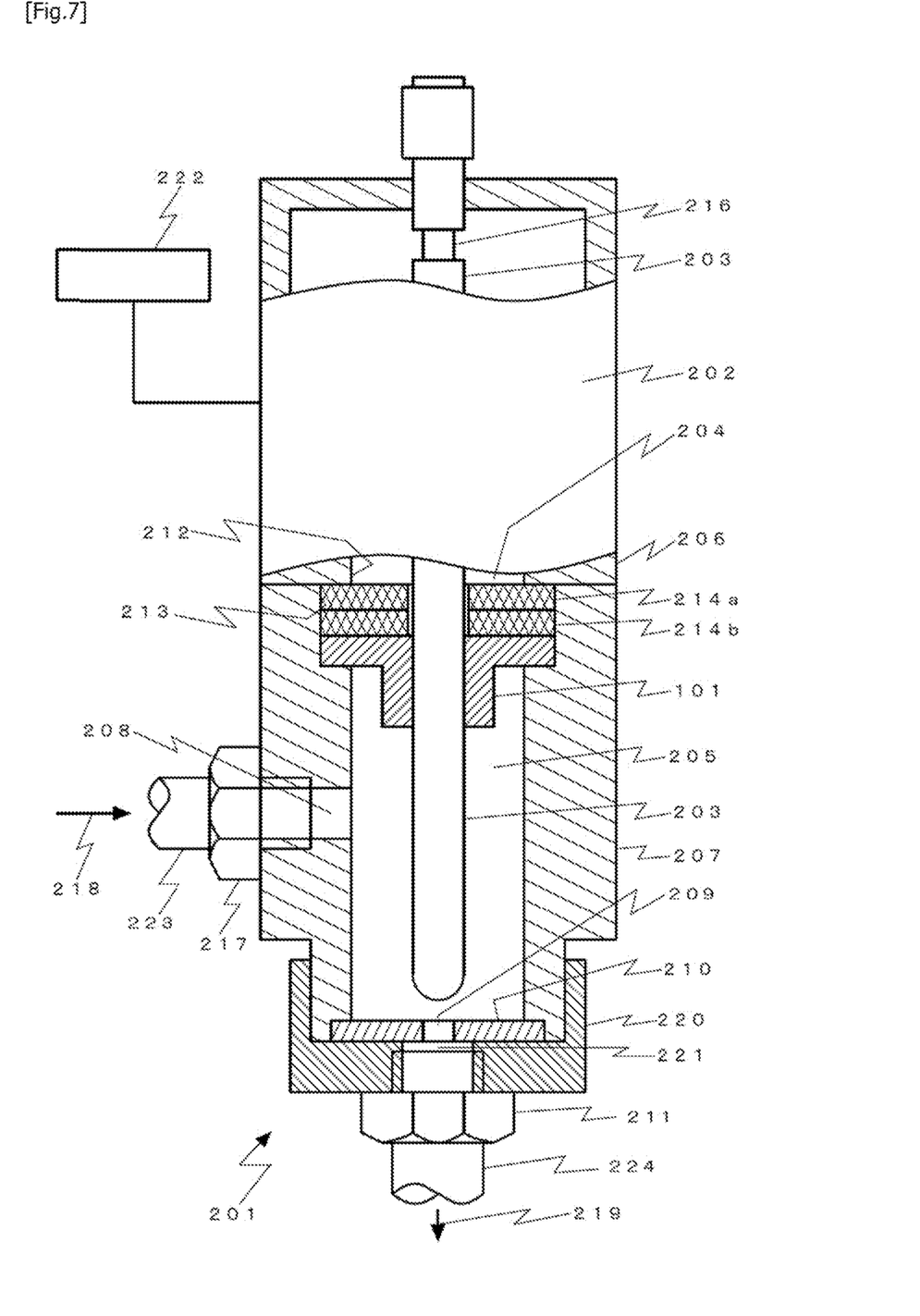
FIG. 7 is an explanatory view of a valve device according to a thirteenth embodiment.

As shown in FIG. 7, the needle driving device 202 moves the needle 203 to an upper position to separate the fore end of the needle 203 from the outflow hole 209 of the valve seat 210. While the outflow hole 209 of the valve seat 210 is open, fluid supplied from the inflow hole 208 (reference symbol 218) passes through the fluid chamber 205 to be ejected from the outflow hole 209 of the valve seat 210 (reference symbol 219).

In contrast, when the needle driving device 202 moves the needle 203 downward, the seal 101 deforms as shown in FIG. 3(*c*). Then, the fore end of the needle 203 closes the outflow hole 209 of the valve seat 210, allowing for transition to a closed state where the fluid flow stops. At this time, the elastic deformation of the inner periphery portion 104 of the seal 101 prevents position changing of the needle 203 with respect to the seal 101. In this manner, the needle driving device 202 moves the needle 203 to control the state to be either the open state or the closed state described above, which can control the fluid flow in the valve device 201. For example, the control is performed such that (1) the device is usually in the open state and, when necessary, transitions into the closed state, or conversely, (2) the device is usually in the closed state and, when necessary, transitions into the open state.

In the above operation, it is assumed that the state shown in FIG. 3(*c*) is the closed state and the state shown in (*b*) is the open state, but any one of positional relationships of (*a*) to (*c*) shown in FIG. 3 may correspond to an open state and a closed state. For example, it is disclosed that FIG. 3(*b*) is a closed state and FIG. 3(*a*) is an open state, or that FIG. 3(*c*) is a closed state and FIG. 3(*a*) is an open state. In this manner, since the seal 101 is not fixed to the needle 203 with a fixing member such as a screw, the positional relationship between the seal 101 and the needle 203 can be freely rearranged. However, in terms of reducing load on the seal 101, it is preferable that the seal 101 is in the load-free state of FIG. 3(*b*) when no operation is ongoing and that deformation states (states of FIGS. 3(*a*) and (*c*)) will not last for a long time based on a controlling condition.

When operating the needle 203, a stroke, which is a travel distance, requires attention so as not to become too large. A large stroke may cause the needle 203 to slide due to insufficient deformation capacity of the inner periphery portion 104 or cause the inner periphery portion 104 to plastically deform due to excess of an elastic limit (stress). In order to restrict the stroke, a stroke adjustment mechanism may advantageously be provided. The stroke adjustment mechanism is used not only to restrict the stroke to a small degree but also to adjust it to a desired degree. The stroke adjustment mechanism in the present embodiment is realized by providing a stroke adjustment member 216 that comes in contact with the rear end portion (upper end portion) of the needle 203 to define its position. Unlike this, the stroke adjustment mechanism may be realized by a configuration of the needle driving device 202 with an actuator that can accurately define the position of the needle 203. From another point of view, in a case of a configuration of the needle driving device 202, for example, with an actuator utilizing force of compressed gas or a spring, or utilizing an electromagnet, a length-adjustable stroke adjustment member that hits against the rear end portion of the needle 203 is provided in the driving chamber 204 as an example.

The valve device 201 configured as above causes no sliding (position changing) of the needle 203 with respect to the seal 101 and thus causes no heat generation and no abrasion. This results in less influence on fluid and the seal 101 itself, no dust generation, and longer lifetime of components. Also, the pressing force (reference symbol 110) due to the pressure applied to the fluid, in addition to the restoring force (reference symbol 109) of the seal, can be utilized for fixing the seal 101 to the needle 203, which can more surely prevent the fluid penetration into the driving-chamber 204 side.

Fourteenth Embodiment

Figure 8:
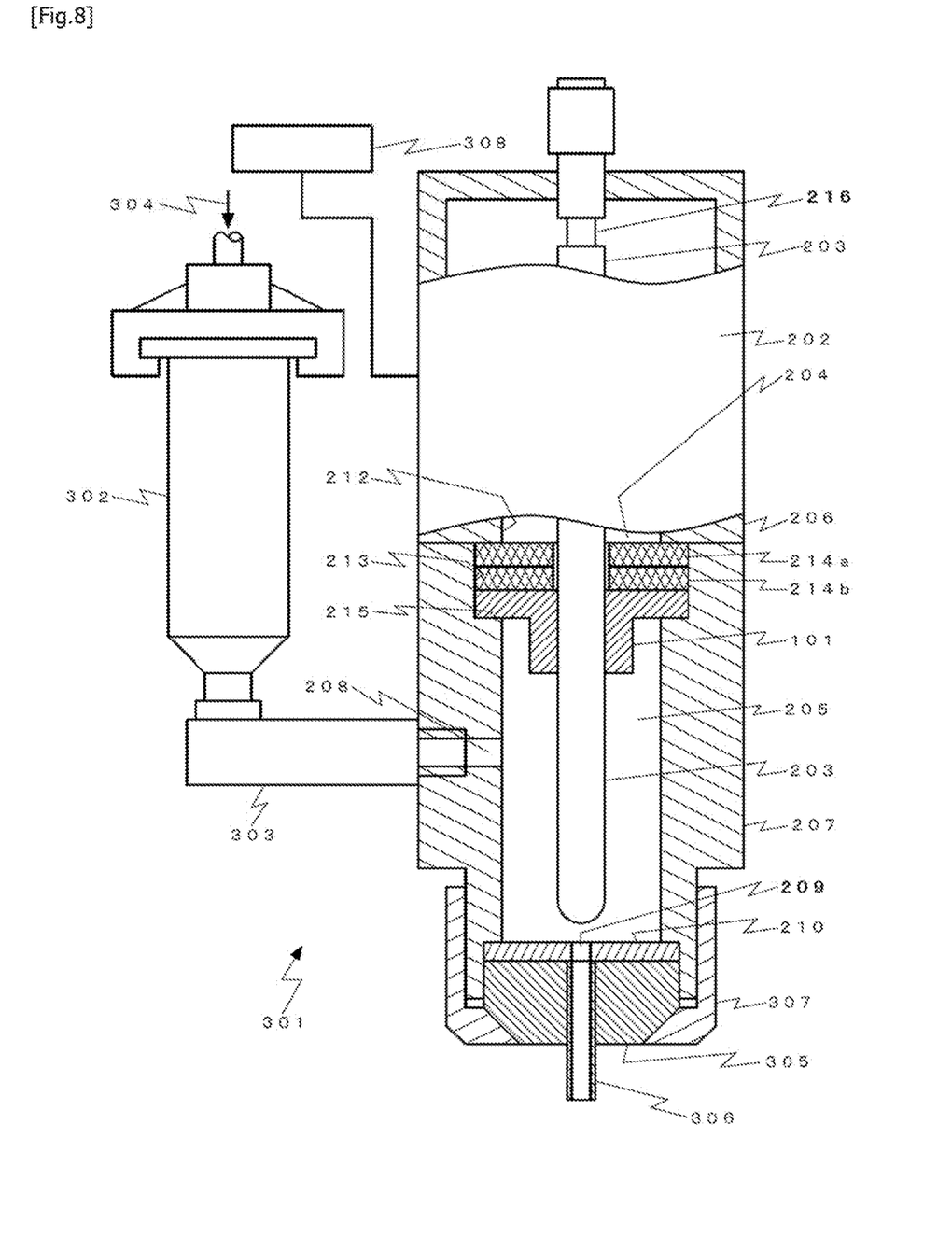
FIG. 8 is an explanatory view of a discharge device according to a fourteenth embodiment.

As shown in FIG. 8, a discharge device 301 according to a fourteenth embodiment has a configuration where a reservoir 302 connects to an inflow hole 208 of a valve device 201 of the above thirteenth embodiment and a nozzle member 305 connects to the lower end portion of a lower housing member 207. Since the valve device 201 is the same as that of the thirteenth embodiment, its explanation is omitted and only different parts will be described.

The reservoir 302, which is a cylindrical container that stores fluid therein, connects via an extended member 303 that is provided to the outside of the inflow hole 208 and has a flow passage therein. A commercial syringe can be used for the reservoir 302. Compressed gas 304 for feeding fluid under pressure is supplied from a compressed gas source, not shown, through the upper portion of the reservoir 302.

Below the valve seat 210, there is provided a nozzle member 305 which is penetrated by a tubular member 306 communicating with an outflow hole 209 of a valve seat 210. A nozzle fixing member 307 fixes the nozzle member 305 together with the valve seat 210 to the lower end of the lower housing member 207 (fluid chamber 205). This nozzle fixing member 307 is detachable and makes replacement of the nozzle member 305 easier. The lower end opening of the tubular member 306 constitutes a discharge port. That is, the fluid supplied into the fluid chamber 205 flows from the outflow hole 209 of the valve seat 210 through the inside of the tubular member 306 to be discharged toward the outside.

A control device 308 controls a needle driving device 202. Additionally it controls pressure of the compressed gas 304 applied to the reservoir 302. Unlike this, another control device may be provided for controlling the pressure of the compressed gas 304 applied to the reservoir 302 and the same configuration as the control device 222 of the thirteenth embodiment may control the needle driving device 202.

The discharge device 301 according to the fourteenth embodiment configured as above operates generally as follows.

Assume that the discharge device 301 is in a closed state during non-operation. First, the needle driving device 202 moves the needle 203 upward to transition from the closed state to an open state. Then, pressurized fluid supplied from the reservoir 302 flows from the inflow hole 208 into the fluid chamber 205 and flows through the outflow hole 209 of the valve seat 210 to be ejected from the nozzle member 305 to the outside. After a lapse of time, the needle driving device 202 moves the needle 203 downward to transition from the open state to the closed state. Then, the fore end of the needle 203 closes the outflow hole 209 of the valve seat 210, which cuts off the fluid flow and stops the ejection from the nozzle member 305. This is one basic discharge operation. In other words, the discharge device 301 ejects pressurized fluid from the tubular member 306 to the outside only for an open-state time.

Thus, in the discharge device 301 using a needle type valve, control of an open-state time and pressure applied to the fluid in the reservoir 302 can achieve control of the fluid amount discharged from the nozzle member 305. Particularly, in the discharge device 301, shorter open-state time (for example, about one second or less) allows fluid to move away from the nozzle member 305 to be discharged in a form of a droplet.

Under the reduced pressure of the fluid supplied from the inflow hole 208, high-speed advancement and sudden stop of the needle 203 may apply inertial force to the fluid material in the fluid chamber 205 to discharge and fly a droplet. This discharge method is sometimes referred to as a jet type discharge method. Jet type discharge methods include a seating style jet type discharge method in which the fore end of the needle 203 comes in contact with the valve seat 210 when forming a droplet, and a non-seating style jet type discharge method in which the fore end of the needle 203 does not come in contact with the valve seat 210 when forming a droplet. The seal 101 of the present invention is applicable to any of them.

As is the case with the valve device 201 of the thirteenth embodiment, when operating the needle 203, a stroke, which is a travel distance, requires attention so as not to become too large. A stroke adjustment member may advantageously be provided as needed.

In the discharge device 301 configured as above, the elastic deformation of the seal 101 during operation of the needle 203 like the above-described valve device 201 prevents sliding (position changing) of the needle 203 with respect to the seal 101 and thus causes no heat generation and no abrasion. This results in less influence on fluid and the seal 101 itself, no dust generation, and longer lifetime of components. Also, the pressing force (reference symbol 110) due to the pressure applied to the fluid, in addition to the restoring force (reference symbol 109) of the seal, can be utilized for fixing the seal 101 to the needle 203, which can more surely prevent the fluid penetration into the driving-chamber 204 side. Furthermore, since the seal 101 is just sandwiched and fixed, the needle 203 is removable without requiring a tool or skill, and additionally, the seal 101 is attachable and detachable without requiring a tool or skill. Therefore, a load of maintenance work can be reduced significantly.

Fifteenth Embodiment

Figure 9:
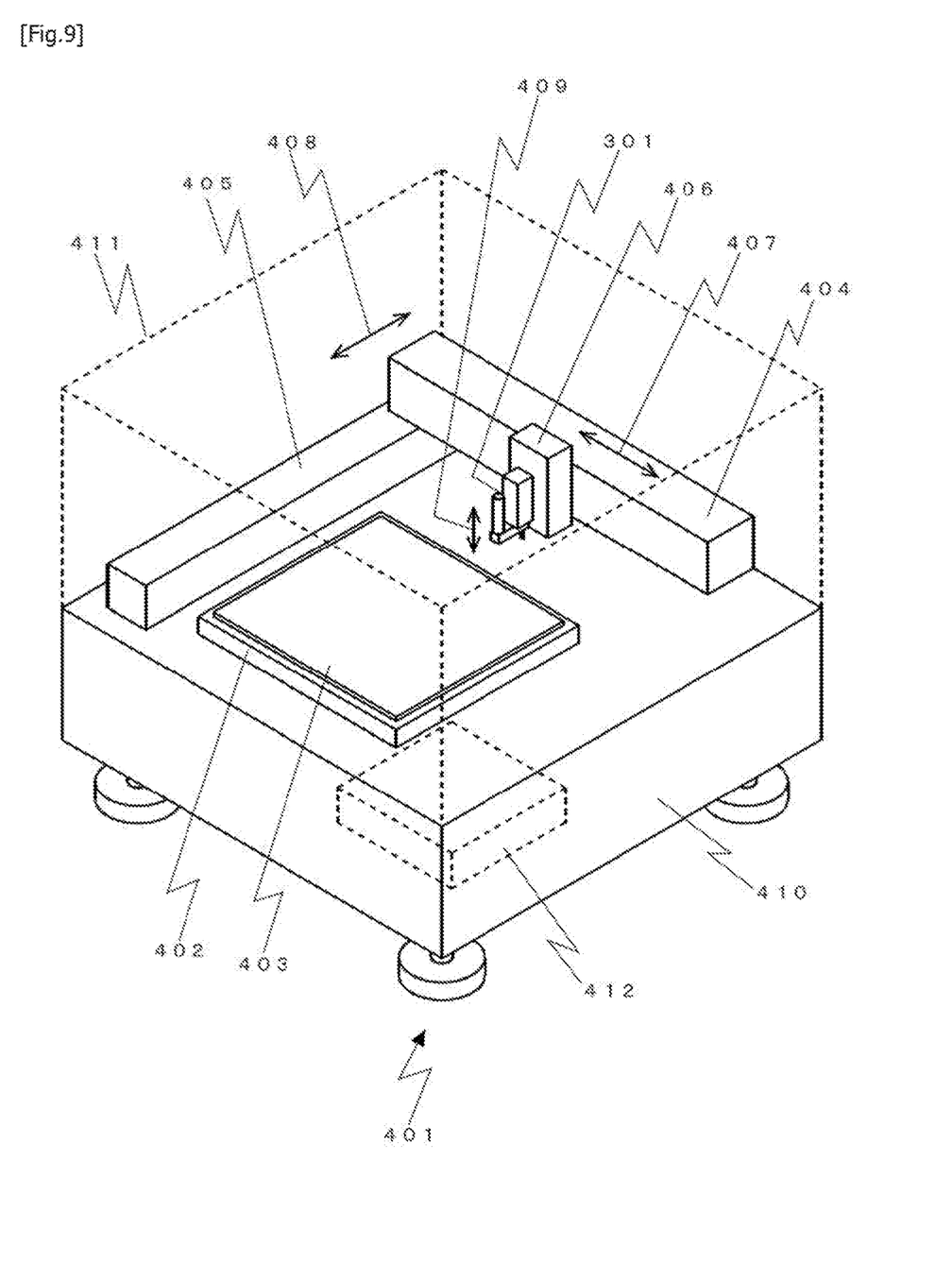
FIG. 9 is an explanatory view of an application device according to a fifteenth embodiment.

As shown in FIG. 9, an application device 401 according to a fifteenth embodiment mainly includes a discharge device 301 for discharging fluid, a stage 402 having an upper surface on which an application target 403 is placed, an XYZ-driving device (404, 405, 406) that moves the discharge device 301 and the stage 402 relative to one another, and a control device 412 that controls operation of the respective devices.

Since the discharge device 301 is the same as the above-mentioned discharge device 301 described in the fourteenth embodiment, its explanation is omitted and only different parts will be described.

The stage 402 is a flat-plate-like member having a flat upper surface on which an application target 403 is placed. In order to fix the application target 403 to the stage 402, following mechanisms can be used, for example: a mechanism that sucks and fixes the application target 403 by sucking air through a plurality of holes leading from the inside of the stage 402 to the upper surface; and a mechanism that fixes the application target 403 by holding the application target 403 between fixing members which are fixed to the stage 402 with fixing means such as screw(s).

The XYZ-driving device is configured with an X-direction driving device 404, a Y-direction driving device 405, and a Z-direction driving device 406. In this embodiment, the XYZ-driving device moves the discharge device 301 relative to the stage 402 in the X-direction (reference symbol 407), the Y-direction (reference symbol 408), and the Z-direction (reference symbol 409). However, the XYZ-driving device is not limited to the above configuration and may take any mode that allows the discharge device 301 and the stage 402 to move relative to one another. For example, it may be possible to have a configuration where the discharge device 301 can move in the X-direction (reference symbol 407) and the Z-direction (reference symbol 409), and the stage 402 can move in the Y-direction (reference symbol 408), respectively. Alternatively, it may be possible to have a configuration where the discharge device 301 installed on an inverted U-shaped (also referred to as portal) frame straddling the stage 402 can move in the Z-direction (reference symbol 409), and the stage 402 can move in the X-direction (reference symbol 407) and the Y-direction (reference symbol 408). For the XYZ-driving device, a combination of an electric motor (a servomotor, a stepping motor, or the like) and a ball screw, a linear motor, or the like may be used.

The control device 412 comprises a processing device, a storage device, an input device, and an output device, each not shown, connects to the discharge device 301 and the XYZ-driving device (404, 405, 406) described above, and controls operation of the respective devices. As the processing device and the storage device, for example, a personal computer (PC), a programmable logic controller (PLC), or the like may be used. Also, as the input device and the output device, a keyboard, a mouse, and a display as well as a touch panel combining input and output may be used.

The above-described respective devices are arranged on top of and inside a base 410. The top of the base 410 provided with the discharge device 301, the stage 402, and the XYZ-driving device (404, 405, 406) described above is preferably covered with a cover 411 shown by a dotted line. This can prevent dust from entering the inside of the application device 401, entered dust causing device malfunction or product defect, and prevent careless contact between a worker and a movable portion such as the XYZ-driving device (404, 405, 406). For the convenience in work, an openable door may be provided on the side surface of the cover 411.

The application device 401 according to the fifteenth embodiment configured as above can apply fluid in different forms (for example, a dot, a line, a curve, a combination thereof, and the like) to the application target 403 by combining movement of the discharge device 301 and movement of the XYZ-driving device (404, 405, 406).

LIST OF REFERENCE SYMBOLS 101 seal/102 main body/103 through-hole (needle fitting insertion hole)/104 (flange portion) inner periphery portion/105 (flange portion) outer periphery portion/106 upper end opening/107 lower end opening/108 stepped portion/109 seal restoring force/110 pressing force due to ambient fluid pressure/111 through-hole sidewall/113 tapered portion/114 convexly inward-curving portion/115 convexly outward-curving portion/116 rectangular-sectioned protrusion/117 a circular-sectioned protrusion/118 trapezoidal-sectioned protrusion/119 downward rectangular-sectioned protrusion/120 upward rectangular-sectioned protrusion/121 upper end portion/122 lower end section/131 upward movement/132 downward movement/201 valve device/202 needle driving device/203 needle/204 driving chamber 205 fluid chamber/206 upper housing member/207 lower housing member/208 inflow hole/209 outflow hole/210 valve seat/211 fixing member/212 lower driving chamber interior wall/213 expanding-diameter wall/214a, 214b seal holding members/215 stepped portion/216 stroke adjustment member/217 fixing member/218 fluid supply direction/219 fluid ejection direction/220 valve seat fixing member/221 valve seat fixing member through-hole/222 control device (valve)/223 supply pipe 224 ejection pipe/301 discharge device/302 reservoir/303 extending member/304 compressed gas/305 nozzle member/306 tubular member/307 nozzle fixing member/308 control device (discharge device)/401 application device/402 stage/403 application target/404 X-direction driving device/405 Y-direction driving device/406 Z-direction driving device/407 X driving direction/408 Y driving direction/409 Z driving direction/410 base/411 cover/412 control device (application device)

The invention claimed is:

1. A seal structure of a valve device comprising a fluid chamber having an outflow hole and an inflow hole, and a needle of which fore end reciprocates in the fluid chamber, the seal structure comprising a seal and the needle inserted through the seal,
wherein the seal comprises a main body made of an elastic body having a needle fitting insertion hole formed for the needle to be inserted and fit into, and a flange portion made of an elastic body annularly extending from the main body in a radial direction outward, and
wherein an end opening diameter $D_3$ of the needle fitting insertion hole on an outflow-hole side is smaller than an end opening diameter $D_2$ of the needle fitting insertion hole on a side opposite to the outflow hole, and the end opening diameter $D_3$ on the outflow-hole side and the end opening diameter $D_2$ on the side opposite to the outflow hole are both smaller than a diameter $D_1$ of the needle.

2. The seal structure according to claim 1, wherein the main body and the flange portion are integrally formed.

3. The seal structure according to claim 1, wherein the needle fitting, insertion hole (a) comprises a first diameter, a second diameter, and a stepped portion,
(b) has a cross section where an inner periphery surface is tapered,
(c) has a cross section where an inner periphery surface curves convexly inward, or
(d) has a cross section where an inner periphery surface curves convexly outward.

4. The seal structure according to claim 1, wherein an outer periphery portion of the flange portion has a protrusion formed on at least one side out of an outflow-hole side and a side opposite to the outflow hole.

5. The seal structure according to claim 1, wherein the flange portion extends in a radial direction outward from a position nearer to an end portion on the side opposite to the outflow hole than to an end portion on the outflow-hole side.

6. The seal structure according to claim 1, wherein the flange portion extends in a radial direction outward from an end portion of the main body on the side opposite to the outflow hole.

7. A seal structure of a valve device comprising a fluid chamber having an outflow hole and an inflow hole, and a needle of which fore end reciprocates in the fluid chamber, the seal structure comprising a seal and a housing in which the fluid chamber is formed,
wherein the seal comprises a main body made of an elastic body having a needle fitting insertion hole formed for the needle to be inserted and fit into, and a flange portion made of an elastic body annularly extending from the main body in a radial direction outward,
wherein the main body of the seal is configured to be narrower than the fluid chamber,
wherein an end opening diameter $D_3$ of the needle fitting insertion hole on an outflow-hole side is smaller than an end opening diameter $D_2$ of the needle fitting insertion hole on a side opposite to the outflow hole,
wherein the housing comprises a first housing member comprising the fluid chamber, and a second housing member comprising a driving chamber that is wider than the needle and through which the needle is to be inserted,
wherein at least one of the first housing member and the second housing member comprises a stepped portion in contact with a surface of the flange portion, the surface being adjacent to an outer periphery edge of the flange portion,
wherein the first housing member and the second housing member are coupled with each other in a state where an outer periphery portion of the flange portion is pressed therebetween, and
wherein an inner periphery portion of the flange portion, when the needle reciprocates, deforms accordingly to keep a positional relationship between the needle and the main body unchanged.

8. The seal structure according to claim 7, wherein an end opening diameter $D_3$ of the needle fitting insertion hole on an outflow-hole side and an end opening diameter $D_2$ of the needle fitting insertion hole on a side opposite to the outflow hole are both smaller than a diameter $D_1$ of the needle.

9. A valve device comprising:
a seal;
a fluid chamber having an outflow hole and an inflow hole;
a needle of which fore end reciprocates in the fluid chamber;
a housing in which the fluid chamber is formed; and a needle driving device that cause the needle to reciprocate;

wherein the valve device ejects fluid, supplied to the inflow hole, from the outflow hole, wherein the seal comprises a main body made of an elastic body having a needle fitting insertion hole formed for the needle to be inserted and fit into, and a flange portion made of an elastic body annularly extending from the main body in a radial direction outward, wherein the main body of the seal is narrower than the fluid chamber, and the needle fitting insertion hole is narrower than the needle, and one end opening diameter $D_3$ of the needle fitting insertion hole is smaller than another end opening diameter $D_2$ of the needle fitting insertion hole, wherein the housing comprises a first housing member comprising the fluid chamber, and a second housing member comprising a driving chamber that is wider than the needle and through which the needle is inserted, wherein at least one of the first housing member and the second housing member comprises a stepped portion in contact with a surface of the flange portion, the surface being adjacent to an outer periphery edge of the flange portion, wherein the first housing member and the second housing member are coupled with each other in a state where an outer periphery portion of the flange portion is pressed therebetween, and wherein an inner periphery portion of the flange portion, when the needle reciprocates, deforms accordingly to keep a positional relationship between the needle and the main body unchanged.

10. The valve device according to claim 9, wherein the needle driving device comprises an actuator, and the valve device further comprises a stroke adjustment mechanism that adjusts a stroke of the needle.

11. A fluid discharge device comprising:

the valve device according to claim 9;

a reservoir fluidically connected to the inflow hole;

a nozzle having a discharge port fluidically connected to the outflow hole; and a valve control device that controls operation of the valve device.

12. The fluid discharge device according to claim 11, wherein the reservoir is a reservoir for a liquid material.

13. The fluid discharge device according to claim 12, wherein the fluid discharge device is a jet type discharge device that discharges and flies a liquid droplet from the discharge port by moving the needle forward to collide against a valve seat that is an inlet portion of the outflow hole or by moving the needle forward and stopping the needle immediately before colliding against the valve seat.

14. An application device comprising:

the fluid discharge device according to claim 11;

a stage on which an application target is placed;

a relative driving device that moves the fluid discharge device and the stage relative to one another; and a stage control device that controls operation of the relative driving device.

* * * * *